United States Patent
Stotz

(10) Patent No.: US 8,356,298 B2
(45) Date of Patent: Jan. 15, 2013

(54) METHOD FOR DATA TRANSMISSION

(75) Inventor: Andreas Stotz, Munich (DE)

(73) Assignee: Fujitsu Siemens Computers GmbH, Munich (DE)

( * ) Notice: Subject to any disclaimer, the term of this patent is extended or adjusted under 35 U.S.C. 154(b) by 887 days.

(21) Appl. No.: 12/133,028

(22) Filed: Jun. 4, 2008

(65) Prior Publication Data

US 2008/0301340 A1    Dec. 4, 2008

(30) Foreign Application Priority Data

Jun. 4, 2007  (DE) .......................... 10 2007 025 989

(51) Int. Cl.
*G06F 9/455* (2006.01)
(52) U.S. Cl. ................ 718/1; 711/6; 711/202; 711/210; 712/228; 712/229; 370/463
(58) Field of Classification Search .................. None
See application file for complete search history.

(56) References Cited

U.S. PATENT DOCUMENTS

| | | |
|---|---|---|
| 2003/0227929 A1 | 12/2003 | Ambrose |
| 2005/0134904 A1* | 6/2005 | Voskuil .................. 358/1.15 |
| 2005/0154928 A1 | 7/2005 | Larson et al. |
| 2005/0267931 A1 | 12/2005 | Chen et al. |
| 2007/0028244 A1 | 2/2007 | Landis et al. |
| 2007/0038996 A1 | 2/2007 | Ben-Yehuda et al. |
| 2008/0002731 A1* | 1/2008 | Tripathi et al. ............... 370/412 |

OTHER PUBLICATIONS

Ghodke, Ninad. "Virtualization Techniques to Enable Transparent Access to Peripheral Devices Across Networks" Jul. 2004.*
Kistler, M., et al., "Console Over Ethernet," USENIX Annual Technical Conference, USENIX Association, 2003, pp. 125-135.

* cited by examiner

*Primary Examiner* — Emerson Puente
*Assistant Examiner* — Sisley Kim
(74) *Attorney, Agent, or Firm* — Slater & Matsil, L.L.P.

(57) ABSTRACT

A method for data transmission in a system is disclosed. The system includes a computer (1) and a peripheral device (9), which are connected to each other via a network (8). The computer has hardware resources (2), including a network interface (2.3) and a controller (4), which is designed to provide a virtual machine system in that it maps the hardware resources (2), including the network interface (2.3) onto logical interfaces (5, 5.3) in virtual machines (4). A peripheral device adapter (10) provided in the computer (1) is mapped by the controller (3) onto a logical peripheral device interface (11) in one of the virtual machines (4) and data is exchanged between the peripheral device (9) and the virtual machine (4) via the network (8), the peripheral device adapter (10), and the logical peripheral device interface (11) while bypassing the logical interfaces (5.3) mapping the network interface (2.3) into the virtual machines (4).

17 Claims, 2 Drawing Sheets

METHOD FOR DATA TRANSMISSION

This application claims priority to German Patent Application 10 2007 025 989.3, which was filed Jun. 4, 2007 and is incorporated herein by reference.

TECHNICAL FIELD

The invention relates to a method for data transmission, e.g., between a virtual machine of a computer and a peripheral device that can be connected via a network. The invention further relates to a controller, e.g., for a virtual machine system for executing such a method for data transmission.

BACKGROUND

On computers with virtual machines, often also designated as virtual machine systems, different users can execute tasks independently and separately from each other. In virtual machine systems, the common hardware resources of the computer are distributed over several virtual environments, the so-called virtual machines. For the user or users, the virtual machines are presented as stand-alone, independent units. In this context, independent means that different operating systems with a wide variety of different applications, programs, or scripts can be executed on the individual virtual machines. The virtual machines are partitioned from each other so that one virtual machine cannot access the resources (for example, memory area) used by another virtual machine.

The core element of a virtual machine system is a controller, which makes available the hardware resources of the computer via logical interfaces to the individual virtual machines. An operating system or application program provided within a virtual machine accesses the logical interfaces provided by the controller in the same way as an operating system or application program executed directly on the computer would access the hardware resources. In this sense, the controller is transparent for the virtual machines.

In principle, two different types of virtual machine systems can be distinguished. In a first type of virtual machine system, the controller accesses the hardware resources directly, or optionally with the use of BIOS (Basic Input Output System). This is designated as a non-hosted or native system. In such a case, the controller is also called a hypervisor. One example for a non-hosted system is the VM2000 system from the company Fujitsu-Siemens.

In the other case, which is designated as a hosted system, the controller is an application program within an operating system environment executed directly on the computer. This approach offers the advantage that the controller can run during access to the hardware resources of the interfaces, e.g., the API (Application Programming Interface), provided by the operating system. However, a disadvantage compared with a non-hosted system can be that limitations of the operating system environment executed as a host apply for all of the virtual machines. One example of a hosted system is the virtual machine environment Virtual Server from the company Microsoft.

Especially for large non-hosted virtual machine systems, the individual virtual machines are typically used by different users at remote locations relative to the virtual machine system. The peripheral devices needed for this remote operation by the user, such as monitor, keyboard, and mouse, and also audio input or output units or printers, are connected for this purpose to a local computer. The transmission of input and output data between the local computer and the corresponding virtual machine in the central virtual machine system takes place via suitable networks. As the computer, often a standard PC is used by the user or a so-called thin client, which, however, is also essentially a standard PC in a minimum configuration and extremely compact construction.

For transmitting the input and output data, various, usually proprietary protocols are known. Many operating systems make available special protocols in order to transfer the work environment (desktop) of the virtual machine to the local computer, for example, RDP (Remote Desktop Protocol) for Windows XP and XDMCP (X Display Manager Control Protocol) for Linux. For this purpose, the local computer executes a matching application. Furthermore, all of the software elements necessary for controlling the peripheral devices (drivers) must be installed and configured on the local computer.

Known solutions, in order to make available a local workstation with corresponding peripheral devices via a network remote from the virtual machine system, always require a local computer with special applications and drivers for using the local peripheral devices.

SUMMARY

In one aspect, the present invention provides a method for data transmission between the virtual machines of a virtual machine system and peripheral devices connected via a network in which the use of a local computer can be eliminated. Another aspect provides a controller suitable for executing such a method for a virtual machine system.

According to a first aspect of the invention, a method for data transmission in a system with a computer and a peripheral device is disclosed. The computer has hardware resources, including a network interface, and a controller. The controller is designed to make available a virtual machine system in that it maps the hardware resources, including the network interface, to logical interfaces in the virtual machines. The computer and the peripheral device are coupled to a network.

In one embodiment, the method includes the following steps. A peripheral device adapter provided in the computer is mapped by the controller to a logical peripheral device interface in one of the virtual machines. Then data is exchanged between the peripheral device and the virtual machine via the network, the peripheral device adapter, and the logical peripheral device interface while bypassing the logical interfaces mapping the network interface into the virtual machines.

In various embodiments, peripheral devices are represented at the level of the controller by the peripheral device adapter. These peripheral device adapters are then mapped into the individual virtual machines analogously to local hardware resources. The transmission of input and output data into an operating system or an application program of the virtual machines is thus performed in the same way as data would be transmitted from local peripheral devices connected to the computer. In this way, because no special transmission protocol and no interface provided uniquely for the purpose of remote operation are required in the operating system or the application protocol, no corresponding data conversion is necessary on the side of the peripheral device, that is, on the workstation of a user. Therefore, the standard PC or thin client typically required for this purpose can be eliminated in the method according to the application. On the user workstation, peripheral devices can be used, which are based on standard components and which also must have only one network interface.

As another advantage, it results that operating systems, which do not have the special interface for remote operation necessary according to the state of the art, can be operated with the method according to the invention with remote peripheral devices connected via a network. The method manages the logical interfaces of an operating system that local, directly connected peripheral devices would also use. If an interface to a local peripheral device is provided, which is the case at least for peripheral devices, such as keyboard, mouse, or output devices (e.g., monitor) for nearly every operating system, the operating system can be operated remotely with the aid of the described method.

According to an advantageous implementation of the method, for data transmission from the peripheral device to a program running in one of the virtual machines, the following steps are executed. At least one data packet is received from the peripheral device via the network and the data contained in the one or more data packets is made available to a data interface of the peripheral device adapter. The data made available to the peripheral device adapter is transmitted by the controller to the logical peripheral device interface in the virtual machine, after which the data is transmitted from the logical peripheral device interface to the program running in the virtual machine.

According to another advantageous implementation of the method, for data transmission in the reverse direction, the following steps are executed. First data is transmitted from a program running in the virtual machine to the logical peripheral device interface in the virtual machine. Then the data is transmitted to a data interface of the peripheral device adapter by the controller. Then the data transmitted to the peripheral device adapter is sent in the form of at least one data packet via the network interface and the network to the peripheral device.

Both implementations named above allow the transparent representation of a peripheral device connected remotely via the network in an operating system of a virtual machine or in some other program running in the virtual machine. For the program, the peripheral device connected via the network is no different from a peripheral device connected locally, which is why no compatibility problems appear. The controller takes over the allocation of a peripheral device into one of the virtual machines and the partitioning relative to other virtual machines in the same way as hardware resources provided locally.

According to another advantageous implementation, the data transmitted between the peripheral device and the peripheral device adapter has a data format that is specific for the peripheral device and/or is encrypted and/or compressed for transmission.

According to a second aspect of the invention, a controller is provided for a virtual machine system in a computer. The controller is designed to map hardware resources of the computer onto logical interfaces in virtual machines. The controller is further designed to map peripheral device adapters provided in the computer onto a logical peripheral device interface in one of the virtual machines. The advantages of this second aspect of the invention correspond to those of the first aspect.

BRIEF DESCRIPTION OF DRAWINGS

In the following, embodiments of the invention will be explained in more detail with the aid of two figures with reference to an embodiment. Shown are.

Figure 1:
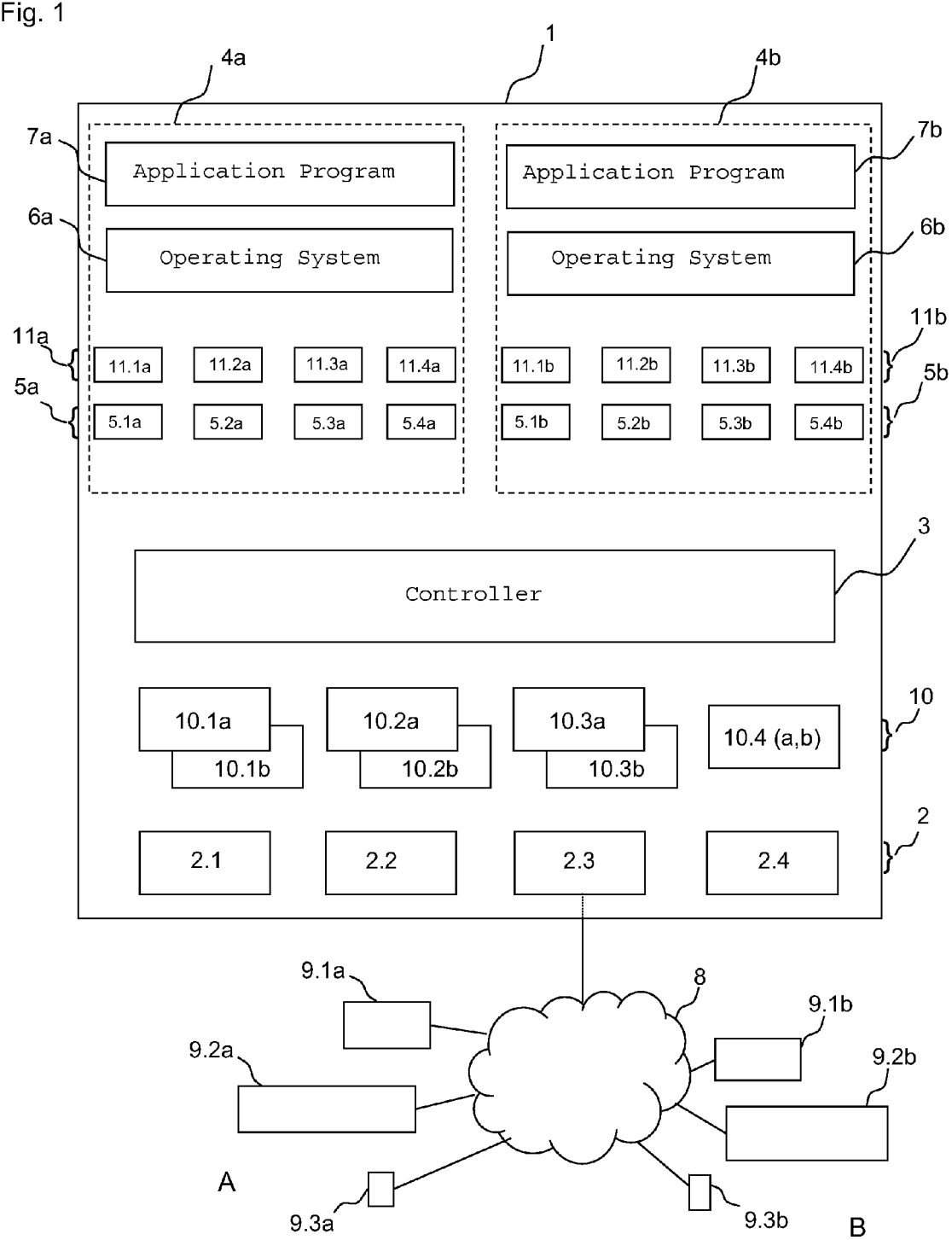
FIG. 1 is a schematic diagram of a computer with virtual machines and peripheral devices, which are connected via a network to the virtual machines.

The following list of reference symbols can be used in conjunction with the drawings 1 Computer
2 Hardware resources
2.3 Network interface
3 Controller
4 Virtual machines
5 Logical interfaces
6 Operating system
7 Application program
8 Network
9 Peripheral device
9.1 Display unit
9.2 Keyboard
9.3 Mouse
10 Peripheral device adapter
11 Logical peripheral device interfaces
12 Network interface
13 Graphics card
14 Monitor
A, B User workstations

DETAILED DESCRIPTION

FIG. 1 shows a computer 1 with hardware resources 2.1, 2.2, 2.3, and 2.4. In the computer 1, there is a controller 3 and two virtual machines 4a and 4b controlled by this controller 3. The virtual machines 4a, 4b each have logical interfaces 5.1a, 5.2a, 5.3a, and 5.4a and 5.1b, 5.2b, 5.3b, and 5.4b, respectively. Each virtual machine 4a, 4b also includes an operating system 6a, 6b, as well as application programs 7a, 7b.

The computer 1 is connected via a network 8 to peripheral devices 9.1a, 9.2a, and 9.3a, as well as 9.1b, 9.2b, and 9.3b.

In addition, the computer 1 has the peripheral device adapters 10.1a, 10.2a, 10.3a or 10.1b, 10.2b, 10.3b, and 10.4 and the virtual machines 4a, 4b have the logical peripheral device interfaces 11.1a, 11.2a, 11.3a, 11.4a or 11.1b, 11.2b, 11.3b, and 11.4b.

In the following, reference symbols without more precise specification, that is, for example, without a ".1" or "a" designate each element corresponding to the higher-order group. For example, the reference symbol 9a is used for the combined designation of the peripheral devices 9.1a, 9.2a, and 9.3a. The reference symbol 5.1 relates analogously, for example, to the logical interfaces 5.1a and 5.1b and the reference symbol 11 includes all of the logical peripheral device interfaces, that is, 11.1a to 11.4a and 11.1b to 11.4b.

As an example, the figure shows a virtual machine system based on the computer 1 of the type of a non-hosted system with two virtual machines 4. For using the virtual machines 4, the peripheral devices 9 coupled via the network 8 are provided. Here, examples of the devices 9.1 are display units, e.g., with a monitor, examples of peripheral devices 9.2 are keyboards and examples of peripheral devices 9.3 are mice. The display unit, the keyboard, and the mouse with the index a form a workstation A for a first user, who is using the virtual machine 4a. The corresponding peripheral devices with the index b form a workstation B for a second user, who is using the virtual machine 4b. Logically, the peripheral devices 9a or 9b are therefore connected to the corresponding virtual machine 4a or 4b.

The number of only two virtual machines 4 is here merely an example and not to be understood as a restriction. Virtual machine systems with a plurality of virtual machines 4 and a corresponding number of peripheral devices 9 connected via the network 8 are conceivable. The network 8 can involve both a local network (e.g., intranet) or a global network (e.g., Internet) or a combination of the two. Physically, the network can be constructed as an Ethernet, Token Ring, or Fiber Channel network, wherein for data transmission, preferably a packet-oriented protocol is used, for example, the connection-oriented protocol TCP (Transmission Control Protocol) based on IP (Internet Protocol) or the connection-free UDP (User Datagram Protocol) based on IP.

In the operation of the virtual machine system on the computer 1, the hardware resources 2 are projected by the controller 3 as logical interfaces 5 into the individual virtual machines 4. For example, the hardware resource 2.1 represents one or more processors of the computer 1. This processor 2.1 is made available to the virtual machines 4a and 4b by the controller 3 as virtual hardware resources in the form of the logical interfaces 5.1a and 5.1b, respectively. From the operating system 6a or 6b or the application programs 7a or 7b, the virtual processor represented by the logical interface 5.1a or 5.1b could also be accessed, like an operating system or an application program running directly, i.e., not within a virtual environment, on the computer 1 could access the processor 2.1. In the same way, the hardware resources 2.2 to 2.4 are represented by the logical interfaces 5.2 to 5.4. As an example, let the hardware resource 2.2 be a working memory of the computer, the hardware resource 2.3 one or more network interfaces, and the hardware resource 2.4 one or more hard disk drives. The methods used by the controller 3 for representing the hardware resources 2 by the logical interfaces 5 are here known and not the subject matter of the present application.

So that the user can work with the virtual machines 4 on the user workstations A and B via the peripheral devices 9, input and output data must be transmitted between the virtual machines 4 and the peripheral devices 9. According to embodiments of the invention, for this purpose, the peripheral device adapters 10 are provided in the virtual machine system. In FIG. 1, the peripheral device adapters 10 are drawn as independent units, but they could also be integrated into the controller 3. Even if the individual peripheral device adapters 10 are eventually allocated to individual virtual machines 4, they are logically not arranged within the virtual machines 4, but instead, comparable with the hardware resources 2, at the level of the common resources of the computer 1 at which the controller 3 also works.

The peripheral device adapters 10 are designed so that data is output via the network interface 2.3 and the network 8 to a peripheral device 9 or data transmitted from a peripheral device 9 is received. Furthermore, the peripheral device adapters 9 make available a data interface, at which data transmitted from a peripheral device 9 can be retrieved or to which data can be transmitted, that is to be transmitted to a peripheral device 9.

The peripheral device adapters 10 are comparable with so-called device drivers. Device drivers are software elements, which are usually executed as background processes and receive data from a device connected to a predetermined connection of a computer and make the data available in a (usually) standardized form for further processing or which, conversely, receive data in a (usually) standardized form and forward it via the predetermined connection to the device. Receiving the data or making it available for further processing can be realized by means of a so-called programming interface, by means of which an operating system or an application program can call routines of the device driver and can transmit data to be transmitted to the routines as parameters. For transmitting parameters, optionally a predefined memory area can also be used. The format in which data is transmitted from the device driver to the device is typically device specific. Through the conversion in the device drivers, however, it is achieved that program in standardized form can be accessed on devices, independent of which physical interface and which type or which data format is used for the data transmission between the computer and the device.

Just like device drivers, the peripheral device adapters 10 are adapted specifically to a certain peripheral device 9. In the embodiment shown in FIG. 1, for each peripheral device 9 there is a peripheral device adapter 10. For example, the peripheral device adapter 10.2b is provided for the peripheral device 9.2b, the keyboard at the user workstation B, and the peripheral device adapter 10.3b is provided for the peripheral device 9.3b, the mouse at the user workstation B. Analogously, the peripheral devices 10.2a and 10.3a are provided for the corresponding peripheral devices 9.2a and 9.3a at the user workstation A. The peripheral device adapters with a comparable function, that is, e.g., the peripheral device adapters 10.3a and 10.3b, can involve two instances of the same adapter if the connected peripheral devices 9.3a and 9.3b are identical or compatible, or else also instances of different adapters.

The peripheral device adapter 10.4 shows an alternative embodiment. Here, for several identical or compatible peripheral devices not shown in the figure only one adapter is provided, which, however, differentiates between the different peripheral devices to which it is allocated at its output, for example, the programming interface.

To allow a unique allocation between the peripheral devices 9 and the peripheral device adapters 10, the peripheral devices 9 are equipped with a unique identifier, for example, an identification number. This identifier is transmitted in each data exchange between the peripheral devices 9 and the peripheral device adapters 10. For the data transmission provided in the network 8 in the form of data packets, each exchanged data packet is then provided, for example, with the identifier of the peripheral device 9 or the corresponding peripheral device adapter 10. One form of identifier is already given by the network address, which must be allocated uniquely to each device in a network. Independently or additionally, a fixed identification number allocated to each device can be specified, for example, the MAC (media access control) address, which is allocated by the manufacturer to each network adapter and is assigned to this adapter uniquely worldwide.

According to embodiments of the invention, for data transmission between the peripheral devices 9 and the virtual machines 4 there is a two-step mapping process. The first step is realized by the peripheral device adapter 10 and the second step includes mapping the data interfaces of the peripheral device adapter 10 onto the logical peripheral data interfaces 11 in individual virtual machines 4 by the controller 3. This mapping is performed analogously to the mapping of the hardware resources 2 onto the logical interfaces 5 in the virtual machines 4. The operating system 6 or an application program 7 in one of the virtual machines 4 can access the logical peripheral device interfaces 11 just like an operating system or an application program running directly on the computer 1 would access a peripheral device represented by a device driver.

In the following, the transmission of data between one of the peripheral devices 9 and one of the virtual machines 4 will be described in more detail using two examples.

For example, when the user at the user workstation A presses a button on the keyboard 9.2a connected to the network 8, this generates a key code assigned to the key in the keyboard 9.2a. The key code is embedded in a data packet by a network interface, which is provided in the keyboard 9.2a or connected after the keyboard, and this data packet is provided with the network address of the network interface as the source address and transmitted via the network 8 and the network interface 2.3 to the peripheral device adapter 10.2a of the virtual machine system. For this purpose, the address of the network interface 2.3 of the computer 1 is known to the network interface of the keyboard 9.2b, e.g., with reference to a configuration by means of manual setting options on the keyboard 9.2a or in that the address is transmitted once via the network 8 to the network interface of the keyboard 9.2a for configuring this interface.

Such a data packet received by the network interface 2.3 of the computer 1 is then identified with reference to the source address contained in the data packet as a data packet originating from the keyboard 9.2a. The keyboard code contained in the data packet is extracted and fed to the proper peripheral device adapter 10.2a. This allocation can be performed with the aid of the controller 3, in which the keyboard 9.2a and the peripheral device adapter 10.2a are registered and allocated to each other. For example, it can be provided that the data packets are transmitted from the keyboard 9.2a to the virtual machine system with a predetermined port number assigned to and reserved for the peripheral devices 9. In IP protocol, the port number represents a sub-address, which is typically used for distinguishing between different services (Web server, FTP server, database server, etc.). The controller 3 can then be designed to "listen" to the predetermined port and to receive data packets directed to the port with the predetermined port number.

The reaction to a keyboard input is typically controlled by a keyboard driver by means of calling a predefined interrupt routine. The adapter 10.2a is designed accordingly to output an appropriate interrupt call to its output, the data interface, after detection of a key code transmitted by the keyboard 9.2a.

Because the peripheral device adapter 10.2a is mapped by the controller 3 onto the logical peripheral device interface 11.2a in the virtual machine 4a, the output interrupt call is thus forwarded into the virtual machine 4a. Within the virtual machine 4a, the interrupt call leads in a known way to the result that a routine provided in the operating system 6a for interrupt handling receives the keyboard code and a character code assigned to the key code is determined with reference to a keyboard table and further processed. For the virtual machine 4a, the key code received via the network 8 is presented exactly as if it had been output from a keyboard connected in the usual way locally to the PS/2 (Personal System 2) or a USB (Universal Serial Bus) port of a computer. The transmission of data from the keyboard 9.2a via the network 8 is performed in the form of key codes, also called scan codes, which are packed into network-suitable packets of the network protocol in use. Key codes feature a data output format that is typical and common for commercially available PC keyboards. In this sense, in the embodiment the transmission of data from the peripheral device 9 to the computer system 1 is realized in the data format that is specific for the peripheral device 9.

This offers the advantage that the data output by the keyboard 9.2 does not have to be converted at the user workstation A into a special data format. In the known solutions, in which input and output data is transmitted directly in an operating system according to a special protocol via an interface provided in this operating system especially for the purpose of remote operation, appropriate data conversion is necessary on the side of the user workstation A. The standard PC or thin client typically required for this method is unnecessary in the method according to the application. Instead, at the user workstation, peripheral devices 9 can be used that are based on standard components and that also must have only one network interface.

As another advantage, even operating systems that do not have the special interface for remote operation necessary according to the state of the art can be operated with the method according to the invention with remote peripheral devices 9 connected via the network 8. The method operates the interfaces of an operating system, where these interfaces also use local peripheral devices connected directly. If such an interface is present, which is the case for almost every operating system at least for peripheral devices, such as keyboard, mouse, or (monitor) output devices, the operating system can be used remotely with the aid of the described method.

If the character code assigned to a character of a key is transmitted, due to the conversion of the key code into the character code required on the user workstation A, a corresponding configuration of the keyboard is necessary. For example, the key assignments and the desired output format of the character code, e.g., ASCII (American Standard Code for Information Interchange) or UTF (Unicode Transformation Format), must be set by the user at the user workstation A.

In contrast, except for the configuration of the network address mentioned above, to which the keyboard 9.2a sends its data packets, in the embodiment no configuration at the user workstation A is necessary. Settings for the keyboard, e.g., the assignment of keys to key codes, are performed in the operating system of the virtual machine 4 by selecting a matching keyboard assignment table. This can be performed in a simple way centrally by an administrator of the virtual machine system and does not burden the user at the user workstation A. Especially for peripheral devices with extensive setting options, this represents a large advantage in simplifying the remote operation of the virtual machine system.

It is also conceivable that some settings are performed at the level of the peripheral adapter 10 by an administrator of the computer 1. Such remote peripheral devices 9, already preconfigured by means of their peripheral adapters 10, can then be used without any additional configuration with any operating system 6 and application program 7. This is finally possible in that data is transmitted from the peripheral device 9 to the peripheral device adapter 10 in the data format that is specific for the peripheral device 9 and thus all of the configuration options lie in the virtual machine system.

As another example, the graphics output of an application program 7a of the virtual machine 4a onto the remote display unit 9.1a at the user workstation A will be described below.

Figure 2:
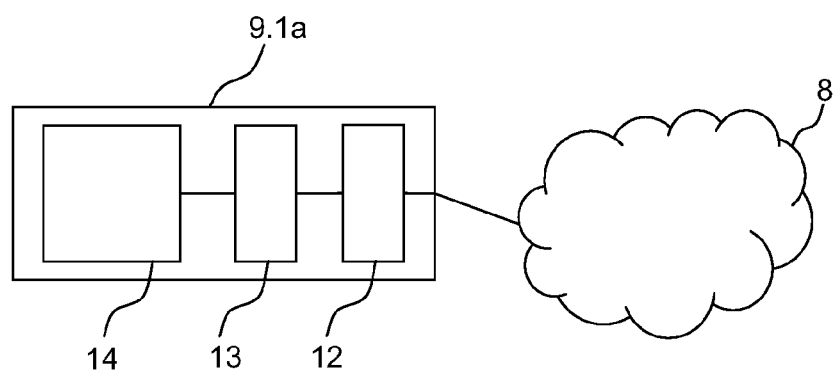
FIG. 2 is a schematic diagram of a peripheral device for connecting to a virtual machine via a network.

FIG. 2 shows a schematic view of a suitable output unit 9.1a. The output unit 9.1a has a network interface 12, a graphics card 13 connected to this interface, and a monitor 14 connected to this card.

The logical peripheral device interface 11.1a is presented to the application program 7a or the operating system 6a connected in-between as a standardized graphics interface, for example, according to the VGA (Video Graphics Array) or the XGA (Extended Graphics Array) standard. According to these standards, routines are provided by means of which text and graphics output is enabled at a certain fixed resolution and color depth on a monitor.

The logical peripheral device interface 11.1a is mapped in turn onto the peripheral device adapter 10.1a by the controller 3. This mapping leads to the result that the commands transmitted to the logical peripheral device interface 11.1a are forwarded to the peripheral device adapter 10.1a. The peripheral device adapter 10.1a is designed to forward these commands packaged in data packets via the network interface 2.3 and the network 8 to the peripheral device, the display unit 9.1*a*, allocated to it. Also here, the allocation between the peripheral device adapter 10.1*a* and display unit 9.1*a* is managed by the controller 3 in which the address of the network interface 12 of the display unit 9.1*a* needed for the transmission of the data packets is also stored. Here it can also be provided to encrypt the data packets for transmission for security reasons and/or to compress the data for transmission for performance reasons. For encrypted transmission, the SSL (Secure Sockets Layer) protocol is suitable. The data packets received by the network interface 12 of the display unit 9.1*a* are, if necessary, decoded and decompressed for forwarding to the graphics card 13.

The graphics card 13 now executes the commands output by the application program 7*a* and writes contents according to these commands into a graphics memory that is provided on the graphics card 13. In a known way, the contents of this graphics memory is then converted by the graphics card 13 continuously into corresponding analog or digital graphics signals that are fed to the monitor 14 and thus made visible at the user workstation A.

In this example, the transmission of data from the peripheral device adapter 10 to the peripheral device 9 also occurs in a data format that is specific for the peripheral device 9, here the command set of the graphics card 13 of the display unit 9.1*a*. In turn, the advantage is produced that, in contrast to a system in which the graphics card 13 is part of a local computer connected in-between, via which information is exchanged between the peripheral devices 9 and the virtual machine 4 according to the state of the art, no configuration is necessary on the side of the user workstation A.

What is claimed is:

1. A method comprising:
    transmitting input and output data between a computer and a peripheral device, the peripheral device having a first network interface, the computer having hardware resources including a second network interface, and a controller that is designed to make available a virtual machine system by mapping the hardware resources including the second network interface onto logical interfaces in virtual machines, the second network interface of the computer and the first network interface of the peripheral device being connected to a network without a further computer local to the peripheral device connected in-between;
    mapping a peripheral device adapter provided in the computer onto a logical peripheral device interface in one of the virtual machines by the controller, wherein the peripheral device adapter is adapted specifically to a certain peripheral device; and
    exchanging input and output data between the peripheral device and the virtual machine via the first network interface, the network, the second network interface, the peripheral device adapter, and the logical peripheral device interface while bypassing the logical interfaces mapping the second network interface into the virtual machines, the exchanging input and output data comprising:
        receiving at least one data packet from the peripheral device identified by a network address of the first network interface via the network;
        making the input and output data contained in the at least one data packet available to a data interface of the peripheral device adapter;
        transmitting the input and output data made available to the data interface of the peripheral device adapter to the logical peripheral device interface in the virtual machine by the controller; and
        transmitting the input and output data from the logical peripheral device interface to a program running in the virtual machine.

2. The method according to claim 1, wherein exchanging input and output data comprises transmitting input and output data from a program running in one of the virtual machines to the peripheral device, wherein transmitting input and output data comprises:
    transmitting input and output data from a program running in the virtual machine to the logical peripheral device interface in the virtual machine;
    transmitting the input and output data to a data interface of the peripheral device adapter by the controller; and
    transmitting the input and output data transmitted to the peripheral device adapter in the form of at least one data packet via the network interface and the network to the peripheral device identified by the network address.

3. The method according to claim 1, wherein input and output data exchanged between the peripheral device and the peripheral device adapter has a input and output data format that is specific for the peripheral device.

4. The method according to claim 1, wherein exchanging input and output data comprises encrypting the input and output data for transmission between the peripheral device and the peripheral device adapter.

5. The method according to claim 1, wherein exchanging input and output data comprises compressing the input and output data for transmission between the peripheral device and the peripheral device adapter.

6. The method according to claim 1, wherein exchanging input and output data comprises exchanging input and output data over the Internet.

7. An apparatus for a virtual machine system in a computer, the apparatus comprising a processor operating as a controller wherein the processor is designed to:
    transmit input and output data between a computer and a peripheral device, the peripheral device having a first network interface, the computer having hardware resources including a second network interface, and a controller that is designed to make available a virtual machine system by mapping the hardware resources including the second network interface onto logical interfaces in virtual machines, the second network interface of the computer and the first network interface of the peripheral device being connected to a network without a further computer local to the peripheral device connected in-between;
    map hardware resources of the computer onto the logical interfaces in virtual machines;
    map a peripheral device adapter provided in the computer onto a logical peripheral device interface in one of the virtual machines, wherein the peripheral device adapter is adapted specifically to a certain peripheral device;
    receive at least one data packet from a peripheral device remote from the computer, via the first network interface, the network, the second network interface, the peripheral device adapter, and the logical peripheral device interface while bypassing the logical interfaces mapping the second network interface into the virtual machines, the peripheral device having the first network interface identified by a first network address for connecting the peripheral device over a data network to the computer without a further computer local to the peripheral device connected in-between, the computer having hardware resources including the second network interface identified by a second network address;
identify the at least one received date packet based on the second network address contained in the data packet as a data packet originating from the peripheral device;
extract input and output data provided by the peripheral device contained in the data packet; and
feed the extracted input and output data to the mapped peripheral device adapter.

8. The controller of claim 7, wherein the peripheral device adapter is designed to receive input and output data from the peripheral device via the Internet.

9. The controller of claim 7, wherein the controller comprises a hypervisor.

10. A computing system comprising:
a processor;
memory coupled to the processor; and
a first network interface coupled to the processor;
the computing system running software programs, including:
   transmit input and output data between a computer and a peripheral device, the peripheral device having the first network interface, the computer having hardware resources including a second network interface, and a controller that is designed to make available a virtual machine system by mapping the hardware resources including the second network interface onto logical interfaces in virtual machines, the second network interface of the computer and the first network interface of the peripheral device being connected to a network without a further computer local to the peripheral device connected in-between;
   a first virtual machine that includes a first operating system and a first application program, the first operating system interacting with hardware resources of the computing system via first logical interfaces;
   a second virtual machine that includes a second operating system and a second application program, the second operating system interacting with the hardware resources of the computing system via second logical interfaces;
   a peripheral device adapter adapted to a peripheral device including a user input device remote from the computing system, the peripheral device having the second network interface identified by a network address, the peripheral device adapter designed to receive input and output data from the input device identified by the network address via the first network interface, the network, the second network interface, the peripheral device adapter, and the logical peripheral device interface while bypassing the logical interfaces mapping the second network interface into the virtual machines without a further computer local to the peripheral device connected in-between, wherein the peripheral device adapter is adapted specifically to a certain peripheral device; and
   the controller to interface between the first logical interfaces and the hardware resources and the second logical interfaces and the hardware resources, the controller also to interface between the peripheral device adapter and at least one of the first virtual machine and/or the second virtual machine.

11. The computing system according to claim 10, wherein the controller interfaces between the peripheral device adapter and a logical peripheral device interface of the first virtual machine.

12. The computing system according to claim 10, wherein the controller interfaces between the peripheral device adapter and at least one of the first virtual machine and the second virtual machine while bypassing at least one of the first logical interfaces and the second logical interfaces.

13. The computing system according to claim 10, further comprising a hard disk drive coupled to the processor.

14. The computing system according to claim 10, wherein the controller interfaces between the peripheral device adapter and the first virtual machine and also interfaces between a second peripheral device adapter and the second virtual machine.

15. The computing system according to claim 10, wherein the controller interfaces between the peripheral device adapter and both the first virtual machine and the second virtual machine.

16. The computing system according to claim 10, wherein the peripheral device comprises a user input/output device remote from the computing system, and wherein the peripheral device adapter is designed to receive input and output data from and transmit input and output data to the input/output device via the network interface.

17. The computing system according to claim 10 in combination with the peripheral device, the network interface of the computing system coupled to the peripheral device via a network without a further computer local to the peripheral devices connected in-between.

* * * * *